United States Patent [19]

Thorne et al.

[11] Patent Number: 5,297,195
[45] Date of Patent: Mar. 22, 1994

[54] METHOD AND APPARATUS FOR AUTOMATIC TELEPHONE SCHEDULING SYSTEM

[75] Inventors: Glenn A. Thorne, Bettendorf; Steven E. Peterson, Davenport, both of Iowa

[73] Assignee: Teledirect International, Inc., Davenport, Iowa

[21] Appl. No.: 769,594

[22] Filed: Oct. 2, 1991

[51] Int. Cl.⁵ .................. H04M 1/64; H04M 11/00
[52] U.S. Cl. ...................................... 379/93; 379/67; 379/88; 379/92; 379/96; 379/218
[58] Field of Search ............... 379/92, 93, 96, 216, 379/218, 262, 67, 88, 89

[56] References Cited

U.S. PATENT DOCUMENTS

| | | | |
|---|---|---|---|
| 3,989,899 | 11/1976 | Norwich | 379/134 |
| 3,999,017 | 12/1976 | Thorne | 379/82 |
| 4,599,493 | 7/1986 | Cave | 379/309 |
| 4,797,911 | 1/1989 | Szlam et al. | 379/92 |
| 4,894,857 | 1/1990 | Szlam et al. | 379/67 |
| 4,922,520 | 5/1990 | Bernard et al. | 379/88 |
| 5,036,535 | 7/1991 | Gechter et al. | 379/201 |
| 5,097,528 | 3/1992 | Garsahaney et al. | 379/201 |
| 5,214,688 | 5/1993 | Szlam et al. | 379/88 |

OTHER PUBLICATIONS

Jorgensen, Jacob W., "The Unique Switching Requirements of Telemarketing Companies", *Telemarketing*, Nov./Dec. 1982, pp. 34–37.

Trager, James S., "Telemarketing Traffic and Its Impact on System Design", *Business Communications Review*, Sep.–Oct. 1984, pp. 23–26.

"The COM System 2100"; The COM System 3100 (TWT, Inc.); and International Telesystems Corporation Is Call Origination Management (International Telesystems Corp.), undated.

*Primary Examiner*—James L. Dwyer
*Assistant Examiner*—Fan Tsang
*Attorney, Agent, or Firm*—Millen, White, Zelano, & Branigan

[57] ABSTRACT

An automatic telephone scheduling system (20) includes a data server (22), a dial server (24), and a plurality of agent workstations (28) which communicate with each other through messages transmitted over a local area network (30). The data server (22) has stored in its memory a plurality of account information records to be utilized for one or more calling campaigns. The dial server (24) includes an independent intelligent processor (80) which functions as a master to the data server (22) but as a slave to the agent workstations (28). The dial server (24) further includes a plurality of audio MUXes (88) and dialers (90) for automatically dialing and connecting calls to the agent workstations (28). In various embodiments, a plurality of data servers and/or a plurality of dial servers are employed.

16 Claims, 10 Drawing Sheets

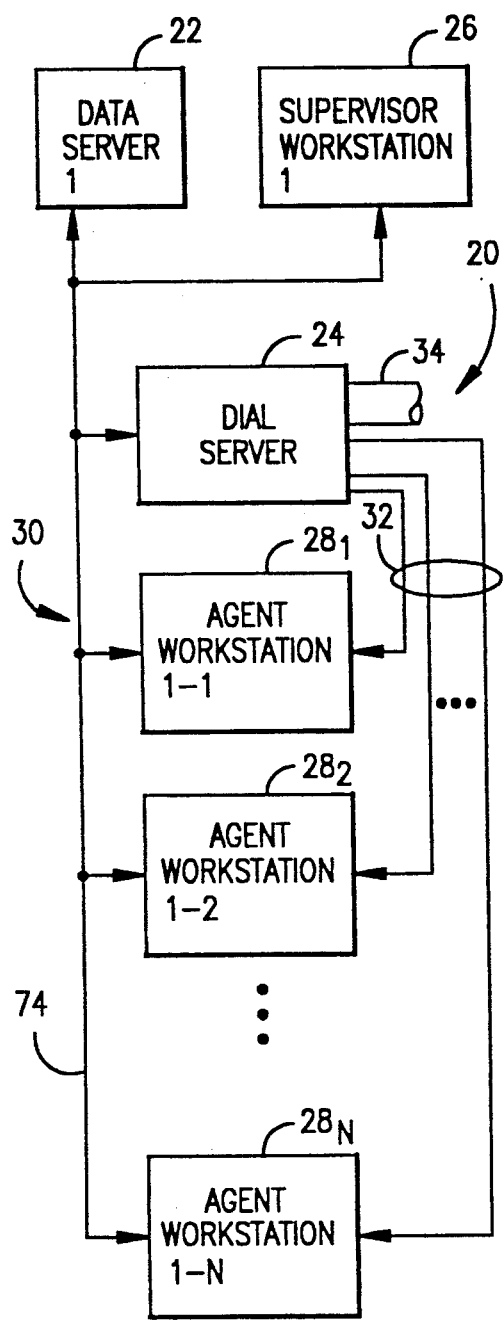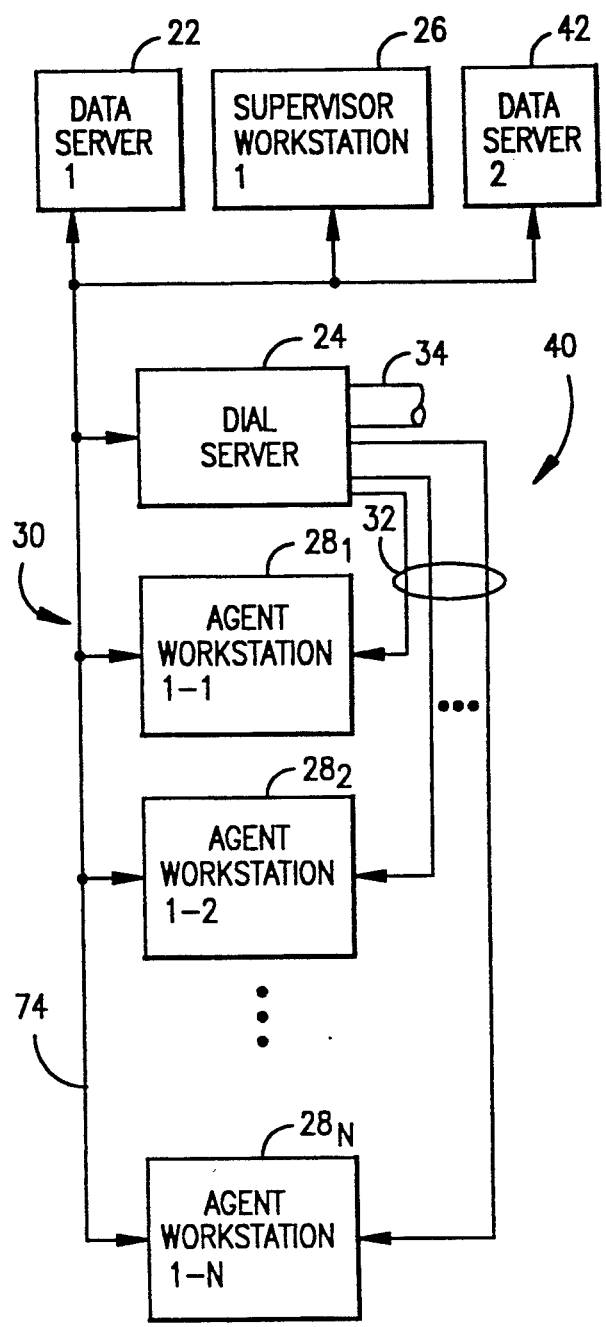

METHOD AND APPARATUS FOR AUTOMATIC TELEPHONE SCHEDULING SYSTEM

BACKGROUND

1. Field of Invention

This invention pertains to method and apparatus for the automated scheduling and placement of numerous telephone calls.

2. Prior Art and Other Considerations

For many businesses, telephonic communication is now the foremost mode of contacting customers, clients, or other patrons. Businesses which must contact a large number of persons generally employ skilled human operators, often salespersons or account managers, for making and handling the telephonic contact. The operators may call an existing potential customer for such purposes as to promote a new product, to resolve billing or payment issues, or to gather research or market information, for example.

Years ago the human operators were provided merely with a list of names and telephone numbers, and a telephone upon which to place telephone calls. Nowadays, several human operators are usually each situated at individual computerized workstations (or "terminals") equipped with a CRT screen, a keyboard, and a telephone audio headset. Through an automated process, other centralized equipment places (e.g., selects, dials, and monitors) each telephone call and, when a call is answered, connects one of the operators to the answered telephone line.

In relatively advanced prior art systems, known as predictive dialing systems, the centralized equipment determines the frequency at which calls should be placed in order to optimally utilize the human operators. In this regard, a pacing scheme or the like is employed so that the human operator will not spend much time listening to ringing telephones, busy signals, and the like.

U.S. Pat. No. 3,989,899 to Norwich discloses a telephone scheduling system wherein a control unit receives telephone number-inclusive code words from storage and transfers the code words to a plurality of registers. The control unit further directs one of the registers to transmit (via a switching unit) the telephone number of its code word to a single, automatic dialer shared by all the registers. The automatic dialer places the call on a telephone system, which includes a signal generator for generating a signal indicative of the status of the dialed line. In accordance with the generated status signal, through the switching unit the control unit functionally couples a register with an available operator station and the answered telephone line with the available operator station.

U.S. Pat. No. 4,599,493 to Cave shows a host computer which extracts a group of telephone numbers from customer data records and sends the telephone numbers to a central controller of telephone control system. The telephone control system makes and monitors the telephone calls. For answered calls the control system connects an operator audio unit to the answered telephone line, and sends the telephone number and operator terminal identification back to the host computer. The host computer controls the operation of the operator terminals. Updating of customer record information from the operator terminals occurs directly to the host computer.

U.S. Pat. No. 4,894,911 to Szlam et al. discloses a mainframe computer which sends batches of customer account information to a system controller via a data controller. The system controller directs trunk interface units to dial the customer's telephone number and monitor the status of the outgoing calls. When the appropriate trunk interface unit advises the system controller that an outgoing call has been answered, the system controller ultimately directs a switch to connect the answered trunk to an available operator terminal, and supplies abbreviated customer account information to the terminal. The operator terminal can then requests the full customer account information from the mainframe computer via the data controller.

A prior art system known as the Teledirect CTS-515 comprised a command center connected to a plurality of operator terminals or workstations. Each workstation had a dial/monitoring board as well as its own on-board processor. The command center included a data base of customer records. The command center periodically sent each processor entire data records for a batch of customers. Each terminal processor extracted the telephone number from a data record and directed the dial/monitor board to place an outgoing call. When a response was detected to an outgoing telephone call, the operator whose workstation placed the call was notified. The operator could then either take the call, or put the call on a network for another operator to answer.

In prior art telephone scheduling systems such as those described above, both the dialing apparatus and the operator terminal have functioned as slaves under the control of a centralized unit (labeled by such terms as "control unit", "system controller", "host processor", or "command center". Paths of data flow under the control of prior art centralized units do not afford optimum efficiency and organization for a predictive dialing system.

Moreover, of the prior art telephone scheduling systems which utilize multiple dialers, all dialers were under the control of a common centralized unit, which inaccurately affects the pacing scheme.

Accordingly, it is an object of the present invention to provide method and apparatus for affording greater efficiency in the automatic dialing of telephone calls.

An advantage of the present invention is the provision of an automatic telephone dialing apparatus wherein a plurality of independent, intelligent dialers can simultaneously operate with respect to one or more sources of account information records.

SUMMARY

An automatic telephone scheduling system includes a data server, a dial server, and a plurality of agent workstations which communicate with each other through messages transmitted over a local area network. The data server has stored in its memory a plurality of account information records to be utilized for one or more calling campaigns. The dial server includes an independent intelligent processor which functions as a master to the data server but as a slave to the agent workstations.

In an agent log on mode, an agent at an agent workstation sends an AGENT LOGON message to the data server. In response, the data server returns an AUTHORIZED CAMPAIGN message listing a possible plurality of campaigns in which the agent can participate. The agent indicates his choice in a CAMPAIGN ATTACH message sent to the data server. Using. a CAMPAIGN SPECIFIC INFO message, the data server which is managing the campaign downloads to the agent workstation information necessary for the workstation to conduct the campaign, including the name of the data server which is managing the campaign. After the downloading is completed, the data server issues a START CAMPAIGN message to the agent workstation, after which the agent may begin.

Except during the log on mode and log off mode, each agent workstation communicates essentially exclusively with the dial server. In this regard, an agent workstation, operating in conjunction with a pacing scheme of the dial server, directs the dial server to obtain an account information record from the data server for the campaign in which the agent workstation is participating. The dial server fetches an entire account information record from the data server using the network, and automatically dials a telephone number included in the account record. In this regard, the dial server includes a plurality of audio MUXes and dialers for automatically dialing and connecting calls to the agent workstations. As an answered telephone line is connected to an agent workstation, the dial server also sends the agent workstation the entire corresponding account record as part of a CALLER CONNECT message.

After an answered call is connected to an agent workstation, the agent has an opportunity to modify or supplement the account record. Upon completion of the call, the agent workstation issues a CALL RELEASE message to the dial server so that the dial server can disconnect the telephone line, followed by a RECORD RELEASE message to the dial server which includes the entire account record as modified or supplemented. The dial server then issues an ANSWER UPDATE message to the data server whereby the data server returns the account record to a location in its memory suitable for completed calls.

In various embodiments, a plurality of data servers and/or a plurality of dial servers are employed. When a plurality of dial servers are utilized, each dial server functions in connection with a bank or set of agent workstations to which it is slaved. When a plurality of data servers are utilized, for each campaign one data server must be designated as a manager. When an agent workstation issues a CAMPAIGN ATTACH message, the data server which is the manager of the selected campaign responds with the CAMPAIGN SPECIFIC INFO message which advises the agent workstation, among other things, of the name of the managing data server for the campaign in which the workstation is participating. Thereafter the name of managing data server is included in AGENT AVAILABLE messages to the dial server so that the dial server will know which data server to access in order to obtain account records for a campaign.

In embodiments in which plural data servers are utilized, account records for a single campaign can be stored in memories of more than one data server. In this regard, the managing data server for each campaign includes logic for determining the sequence and locations of record to be accessed for a campaign. The managing data server manipulates a key including file and network path pointer information, which enables the managing data server to access an account record (over the network, if necessary) regardless of whether the account record is stored in the memory of the manager data server or another data server.

The systems of the invention also execute other modes, including a manual dial mode, a call preview mode, and a call transfer mode.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a schematic view of an automatic telephone scheduling and dialing system according to a first embodiment of the invention.

FIG. 2 is a schematic view of an automatic telephone scheduling and dialing system according to a second embodiment of the invention.

DETAILED DESCRIPTION OF THE DRAWINGS

Figure 3:
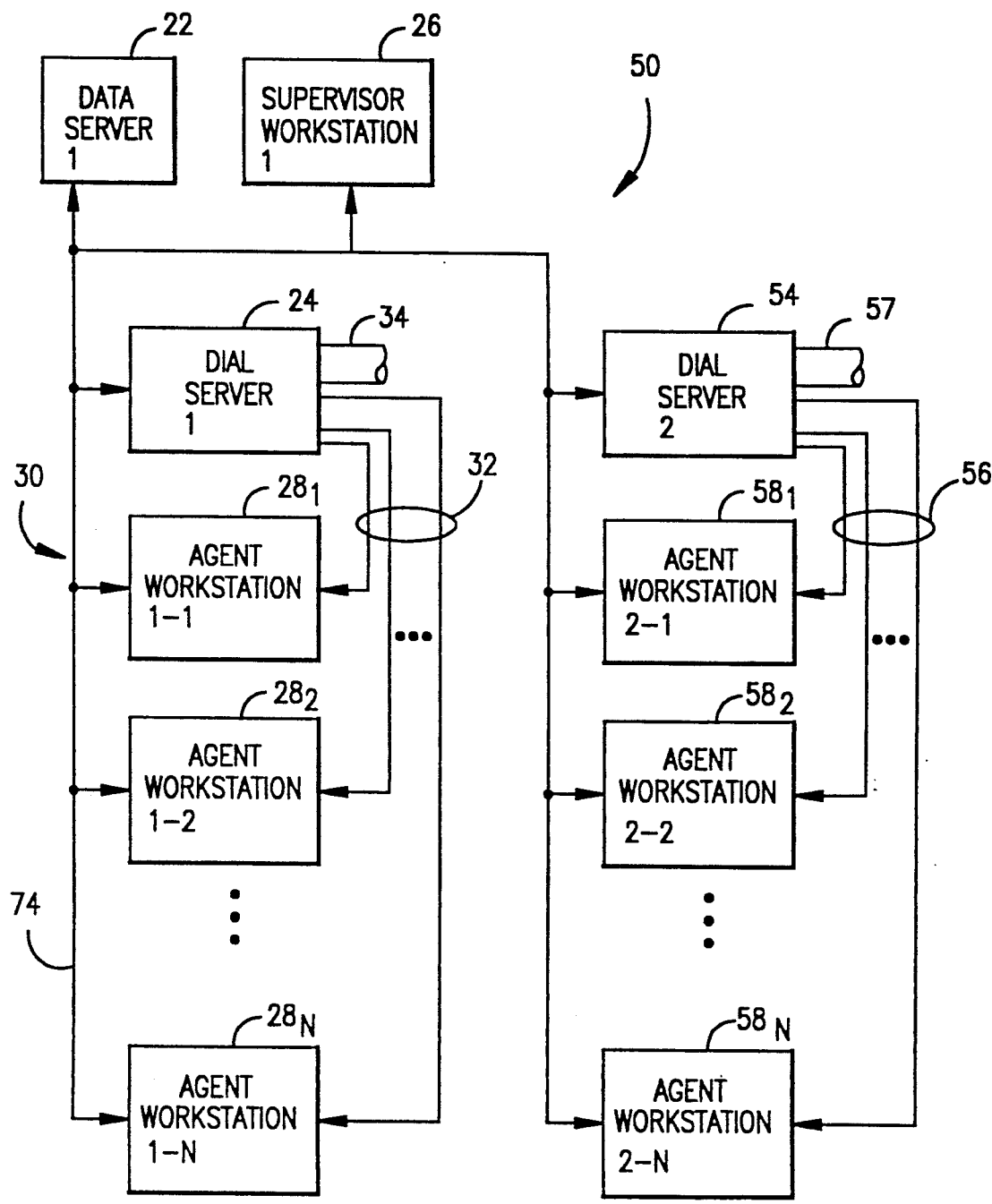
FIG. 3 is a schematic view of an automatic telephone scheduling and dialing system according to a third embodiment of the invention.

FIG. 1 shows an automatic telephone scheduling and dialing system 20 which includes a data server 22; a dial server 24; a supervisor workstation 26; a plurality of agent workstations $28_1$–$28_N$; and, a data communications network 30. The data communications network 30 interconnects the servers 22, 24 and workstations 26, 28 for the transmission of messages therebetween in the manner described hereinafter. The dial server 24 is also connected by a set or cable of audio transmission lines 32 to each of the agent workstations 28, and by a set (or cable) 34 of telephone trunk lines to an unillustrated telephone central station.

FIG. 2 shows an automatic telephone scheduling and dialing system 40 which is similar to the system 20 of FIG. 1, but further including a second data server 42 connected to the data communications network 30.

FIG. 3 shows an automatic telephone scheduling and dialing system 50 which is similar to the system 20 of FIG. 1, but further including a second dial server 54 and a second set of agent workstations $58_1$-$58_N$ connected to the data communications network 30. In like manner as the system 20 of FIG. 1, the dial server 54 of the system 50 of FIG. 3 is also connected by a set of audio transmission lines 56 to each of the agent workstations 58, and by a set 57 of telephone trunk lines to the unillustrated telephone central station.

Figure 4:
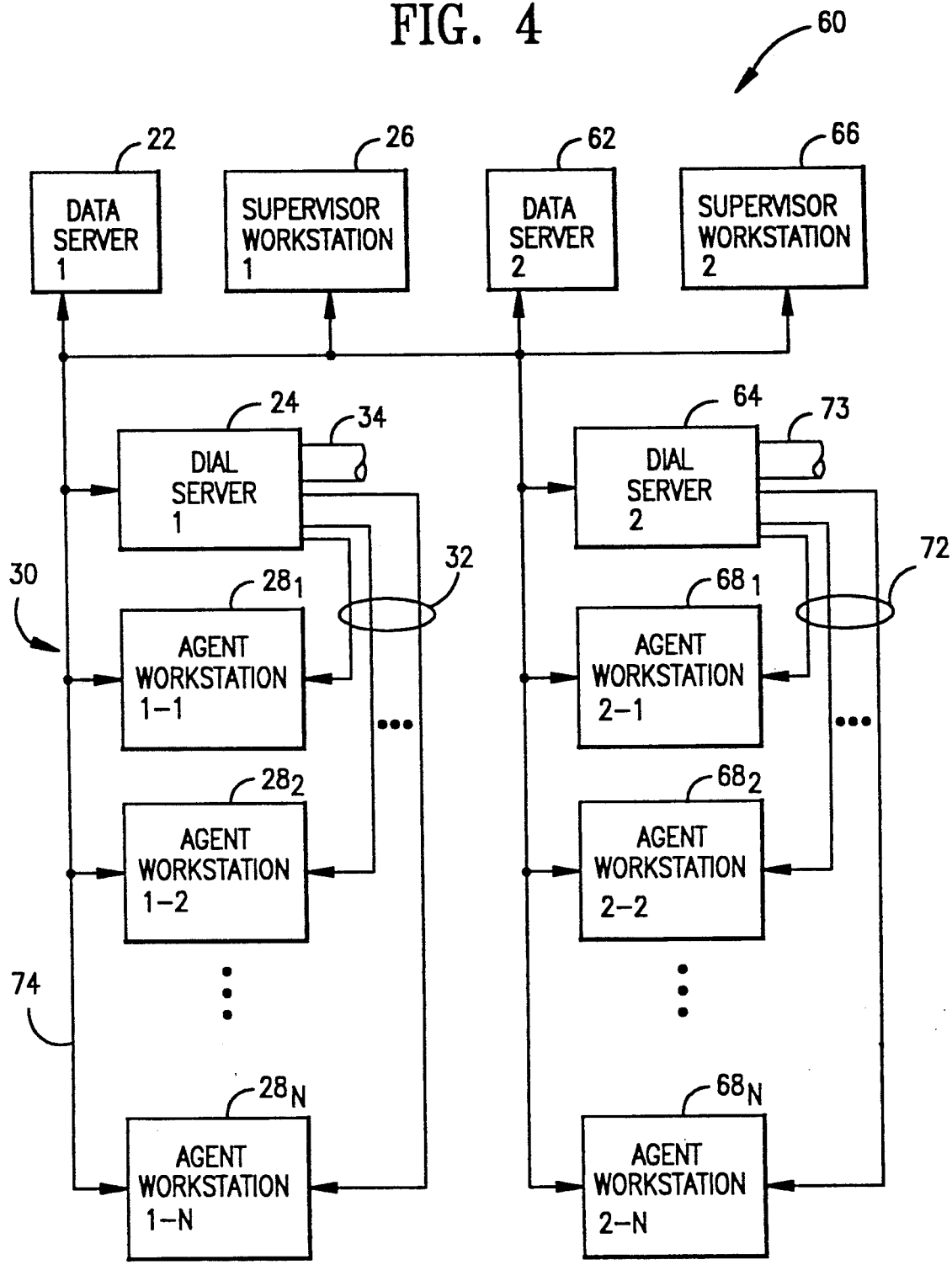
FIG. 4 is a schematic view of an automatic telephone scheduling and dialing system according to a fourth embodiment of the invention.

FIG. 4 shows an automatic telephone scheduling and dialing system 60 which includes the elements of the system 20 of FIG. 1, and further has connected to its data communications network 30 the following: a second data server 62; a second dial server 64; a second supervisor workstation 66; a second set of a plurality of agent workstations $68_1$-$68_N$. The second dial server 64 of the system 60 of FIG. 4 is also connected by a set of audio transmission lines 72 to each of the agent workstations 68, and by a set 73 of telephone trunk lines to the unillustrated telephone central station.

The data communications network 30 is a conventional local area network such as an Ethernet local area network of the type described in publications such as "EtherCard PLUS Elite" by Western Digital Corporation. As seen hereinafter, the data communications network 30 includes a network cable 74 which connects network interface devices (also known as a network adapter) situated at each node of the network 30. The network interface devices include a programming gateway or interface, such as a Network Basic Input/Output System (NetBIOS). The dial servers, data servers, and workstations serve as the nodes of the network 30. Each node has a unique logical node (mailbox) name.

Figures 8, 9:
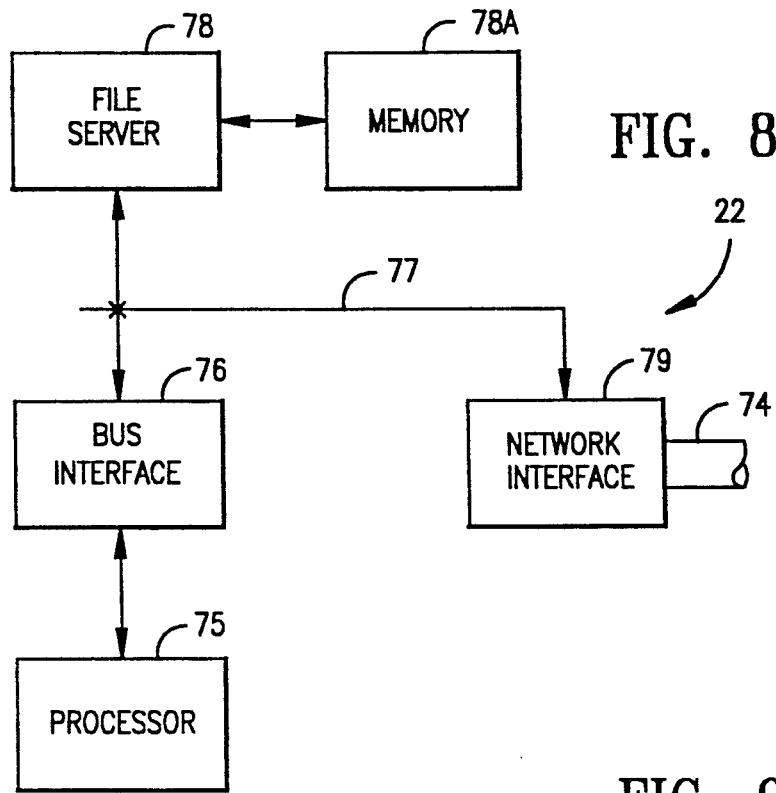
FIG. 8 is a schematic view of a data server according to an embodiment of the invention.
FIG. 9 is a schematic view of a memory accessed by a data server according to embodiments of the invention.

FIG. 8 shows the data servers of the foregoing embodiments, such as data server 22, for example, in more detail. Although reference is made hereinafter to data server 22, it should be understood that the ensuing description is applicable as well to the data servers 42 and 62 of the embodiments of FIGS. 2 and 4, respectively.

Each data server 22 includes a data server processor 75 such as an 80386 - 33 MHz compatible processor of an IBM PC-AT computer. The processor 75 is connected via a bus interface 76 to a data server PC bus 77. The dial server PC bus 77 is also connected to a file server 78 which accesses a memory 78A. The data server PC bus 78 is also connected to a network interface adaptor 79, through which the dial server 22 is connected to the cable 74 of the communications network 30.

In the illustrated embodiment, the file server 78 of the data server 22 is a hard disk drive, and the memory 78A is a 200 MegaByte hard disk. The memory 78A has a plurality of account information records stored therein, with each record containing in appropriate record fields such information as an account name and an account telephone number.

Figure 5:
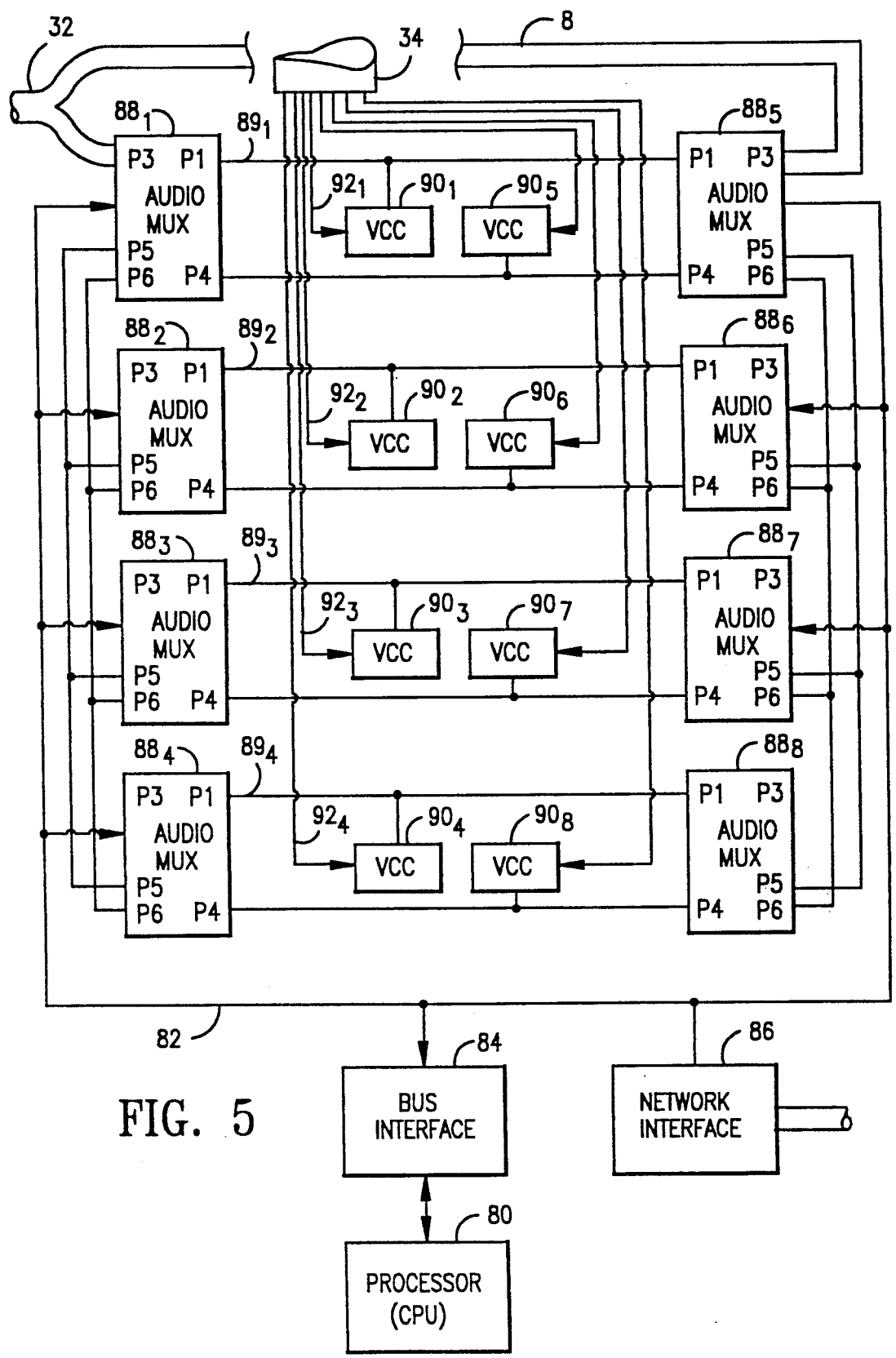
FIG. 5 is a schematic view of a dial server according to an embodiment of the invention.

FIG. 5 shows the dial servers of the foregoing embodiments, such as dial server 24, for example, in more detail. Although reference is made hereinafter to dial server 24, it should be understood that the ensuing description is applicable as well to the dial servers 54 and 64 of the embodiments of FIGS. 3 and 4, respectively.

Each dial server 24 includes a dial server central processor 80. In one embodiment, the dial server central processor 80 is an 80386, 25 MHz compatible processor which is part of an IBM PC computer. The computer includes a PC bus 82 with which the processor 80 communicates through a bus interface 84. A network communications interface 86 and a plurality of audio multiplexers (MUXes) $88_1$-$88_8$ are also connected to the bus 82. Each audio MUX 88 is connected by lines 89 to two voice communications/dial systems (VCC) 90, with audio MUXes $88_1$ and $88_5$ sharing VCC/dialers $90_1$ and $90_5$, audio MUXes $88_2$ and $88_6$ sharing VCC/dialers $90_2$ and $90_6$, and so forth.

Each VCC/dialer 90 automatically dials a telephone number supplied thereto, and contains circuitry necessary to dial, digitize and compress audio, for as many as four telephone lines. In the illustrated embodiments, each VCC/dialer 90 is a Dialog/41 devices described in a Dialogic Corporation publication entitled "Dialog/4x Multi-Line Voice Communication System User's Guide, Version 2.30". Accordingly, each VCC/dialer 90 is connected to the unillustrated central telephone station by a subset 92 of four trunk lines included in the cable 34.

Audio MUX 88 is connected by as many as eight lines of cable 32 to eight of the agent workstations 28, while audio MUX $88_8$ is connected by as many as eight lines of cable 32 to another eight of the agent workstations 28. Thus, each dial server 24 can serve as many as sixteen agent workstations 28 with as many as thirty-two telephone trunk lines (cable 34).

Each audio MUX 88 is, in the illustrated embodiments, an AMX/81 audio multiplexer of the type described in Dialogic Corporation document entitled "AMX/81 Audio Multiplexer Hardware Reference Manual", Version 1.2 (Mar. 31, 1988). As illustrated in more detail in FIG. 6, each audio MUX 88 includes a controller 100 which connects to the bus 82 through a bus interface 102. Each audio MUX 88 further includes a telephone interface 104; a crosspoint switching matrix 106; and, a plurality of voice interfaces $108_1$-$108_N$. In the illustrated embodiment, the controller 100 includes a Zilog Z8536 CIO controller chip. One port of the controller 100 is connected by a cable 110 to carry status information regarding the telephone interface 104; by a cable 112 to carry information output to the crosspoint switching matrix 106; and, by a cable 114 to carry control output to the crosspoint switching matrix 106.

Figure 6:
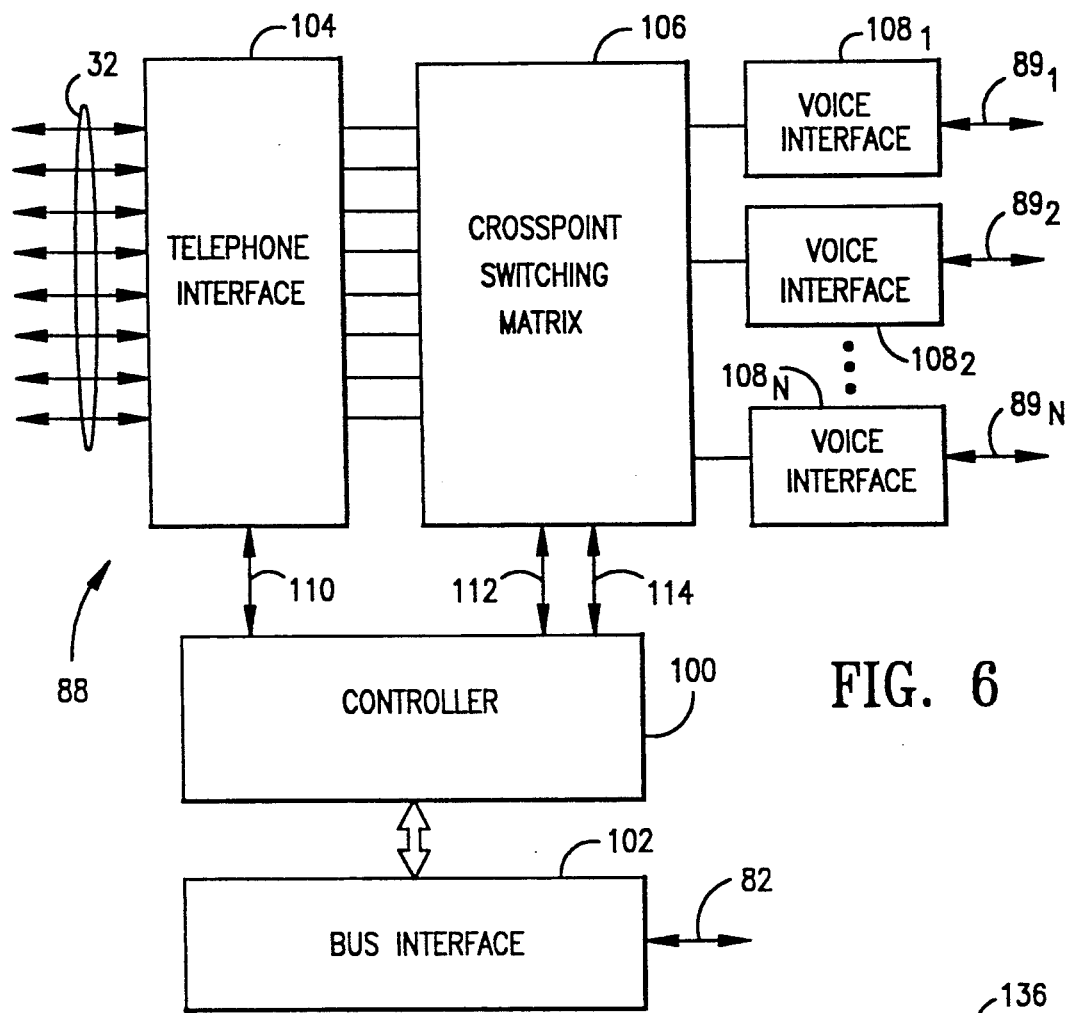
FIG. 6 is a schematic view of a voice communications system according to an embodiment of the invention.

The telephone interface 104 of each audio MUX 88 of FIG. 6 is connected to the crosspoint switching matrix 106, and also by eight of the lines in cable 32 to eight of the agent workstations 28.

The crosspoint switching matrix 106 of each audio MUX 88 of FIG. 6 is an $8 \times 8$ matrix that is managed by the ports of controller 100 to which cables 112 and 114 are connected. Through the crosspoint switching matrix 106, any channel (i.e., telephone line) of a number of VCC/dialers 90 can be ultimately connected to any one of the plurality of agent workstations 28.

Figure 7:
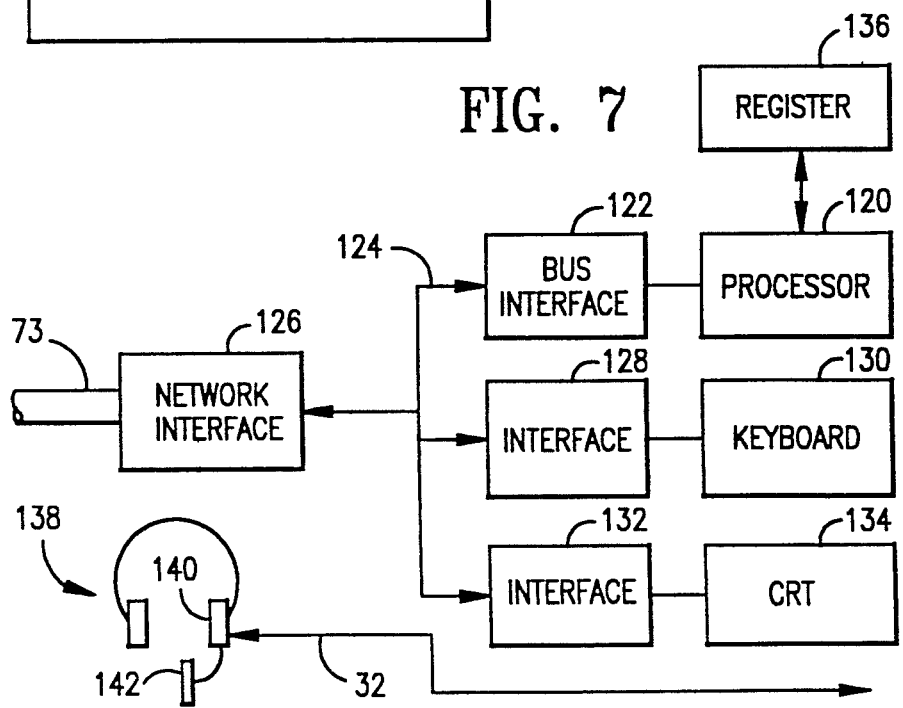
FIG. 7 is a schematic view of an agent workstation according to an embodiment of the invention.

FIG. 7 shows an agent workstation, such as workstation 28, in more detail. Each workstation 28 includes a workstation processor 120, such as an 80286 - 12 MHz compatible processor of an IBM PC-AT computer. The workstation processor 120 is connected via a bus interface 122 to a workstation PC bus 124. The workstation PC bus 124 is connected to the network cable 73 by a network interface adaptor 126.

The workstation PC bus 124 also serves to connect the workstation processor 120 (via interface 128) to a data entry means, such as keyboard 130, and (via interface 132) to a visual display means, such as CRT monitor 134. The workstation processor 120 accesses a data register 136 in which is storable a record of account information. The data register 136 can be internal to the processor 120, or in a memory such as a random access memory (RAM) device, for example.

Each agent workstation 28 also comprises audio transmission means, such as telephone headset 138 with receiver 140 and transmitter 142. The headset 138 is connected to the dial server 24 by lines included in the cable 32, and particularly to the telephone interface 104 included in one of the audio MUXes 88 (see FIG. 6).

The supervisor workstation 26 resembles the agent workstation 28 as shown in FIG. 7, including a processor, visual display means, keyboard, and network interface. In addition, the supervisor workstation includes a large storage device such as hard disk drive. The processor of the supervisor workstation 26 is preferably a 80386-25MHz processor.

OPERATION

The operation of the system of FIG. 4 will first be described. It will be readily understood that the description of the operation of the more complex embodiment of FIG. 4 will encompass a description of the operations of the embodiments of FIGS. 1-3.

In operation, each of the processors included in the data servers 22, 62 and dial servers 24, 64 are booted up. The memory 78A connected to the file server 78 of each data server 22, 62 is loaded with the necessary account records (if account records are not already stored in the memory 78A). The account records are preferably loaded into the memory 78A via the network 30 from the supervisor workstation 26 using conventional network file service.

In the above regard, FIG. 9 shows (in solid lines) a portion 160 of memory 78A loaded with account records $162_1$–$162_Z$. Each record 162 includes a plurality of fields 164, including a record number field $164_1$, a campaign number field $164_2$, an account identification field $164_3$, an account description field $164_4$, and account information field $164_5$, and account telephone number field $164_6$, a data server identification number field $164_7$.

Two of the fields 164 deserve particular comment. Field $164_2$ indicates the number of a campaign for which the corresponding record 162 is to be employed. For example, records numbered 1 through 20,010 are to be used for a first campaign, which can be, for example, a telemarketing campaign to sell widgets. Records numbered from 20,011 through 45,000 are to be used for a second campaign, which may consist of collection calls for newspaper, magazine, or the like. Records numbered from 180,001 to 250,000 are to be used in connection with an "mth" campaign for soliciting donations for a fundraising drive. At least one of the data servers has stored therein predetermined formatting information related to each campaign.

With respect to the data server identification number field $164_7$, all account records stored in the memory 78A for the first data server 22 will have a "1" stored therein; all account records stored in the memory for the second data server 62 will have a "2" stored therein. Thus, it is seen that records for a plurality of campaigns may be distributed throughout a plurality of data servers. That is, account records for any campaign may be stored in one or more data servers.

One data server is designated as a manager for each campaign. For each campaign for which it is a manager, the processor of the data server accesses stored instructions which implement managing logic for keeping track of the locations of account records 162 belonging to the campaign. The managing logic of the processor also determines which account records await processing and which account records have completed processing. The processor of the managing data server keeps track of account record locations by manipulating a locator key, which includes such information as a file name, a network path pointer, and a record number in the file where the network path points.

Thus, a manager data server can determine whether the next account record 162 is to be obtained from its associated memory, or from the memory of another data server. If the next account record is to be obtained from the memory of another data server, the manager data server issues a standard file access message to the other data server on the network 30 for obtaining the required account record. Upon obtaining the required account record 162, the manager data server appends the locator key information (shown by broken lines as being in field 154a of FIG. 9) to the appended account record 162 is included in any messages applied to the network 30.

Figure 10:
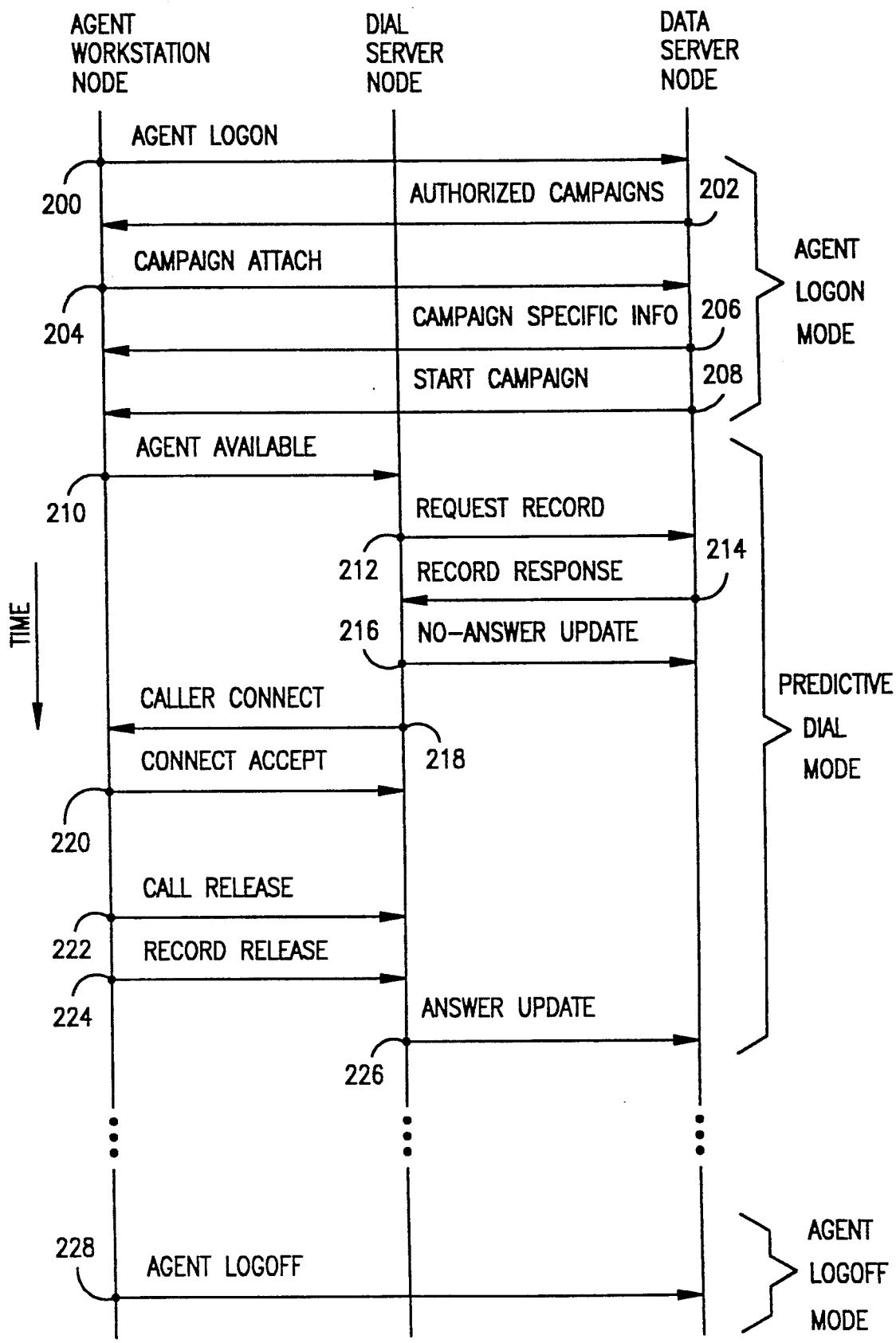
FIGS. 10 and 11 are schematic views of scenarios of sequencing of messages transmitted by elements of the automatic telephone scheduling and dialing system of embodiments of the invention.
Figure 12:
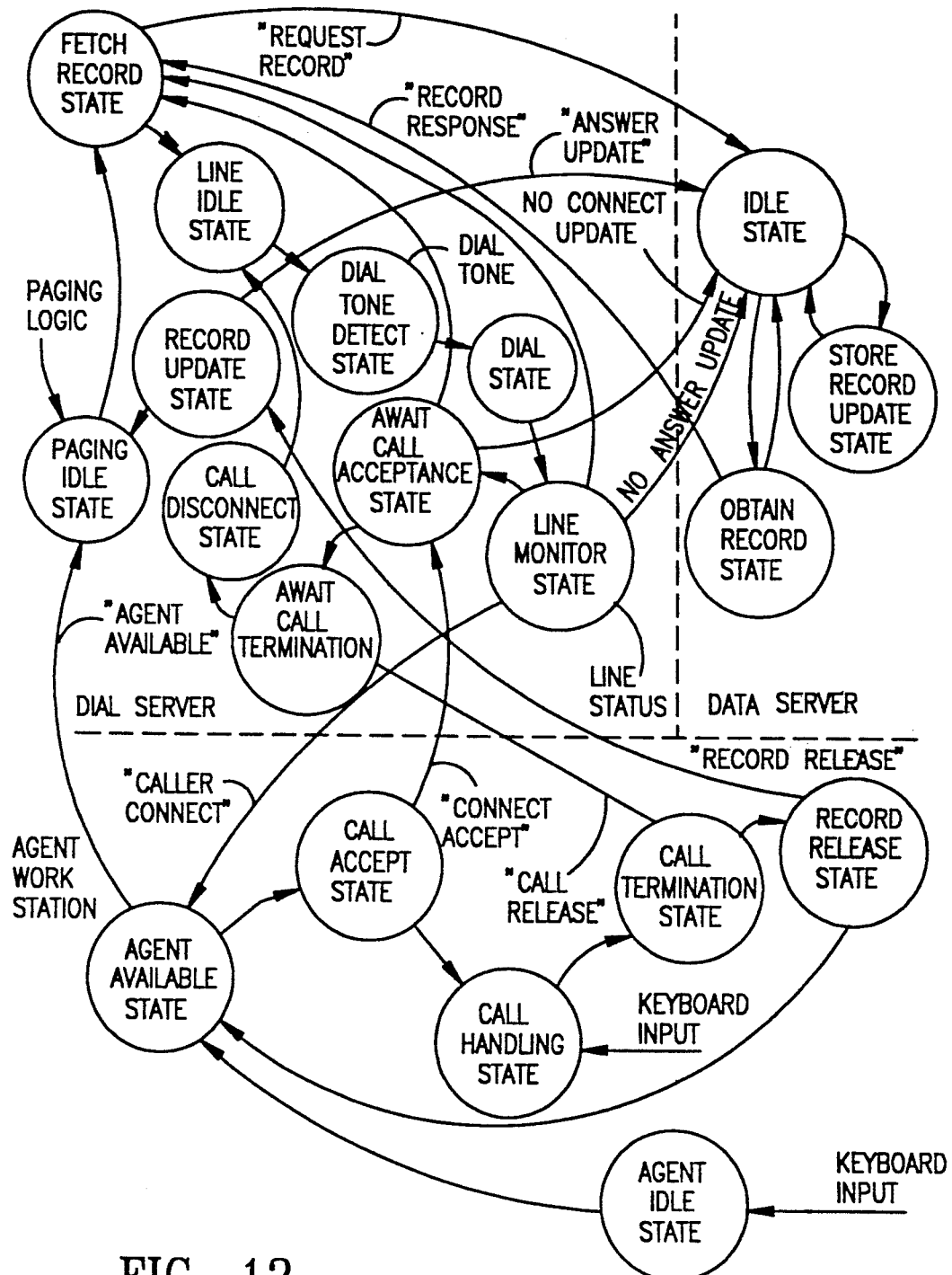
FIG. 12 is a schematic view depicting operational states of elements of the automatic telephone scheduling and dialing system of embodiments of the invention.

FIGS. 10 and 12 together show operation of the system 60 after an agent has booted up the processor 120 included at his agent workstation, such as agent workstation $28_1$, for example. (In the ensuing example, for sake of convenience a generic reference to workstation 28 shall be understood to be applicable to any of the workstations $28_1$–$28_N$ or workstations $68_1$–$68_N$, so long as it is understood that the workstation is paired with a unique dial server). While the agent workstation 28 is in an AGENT IDLE STATE, the agent strikes a key on the keyboard 130 to move the workstation 28 into an AGENT AVAILABLE STATE for initiating an AGENT LOGON message. The AGENT LOGON message is sent from the workstation 28 to the data servers 22, 62 to inform the data servers that the workstation 28 has begun connection to the network 30.

Figure 13:
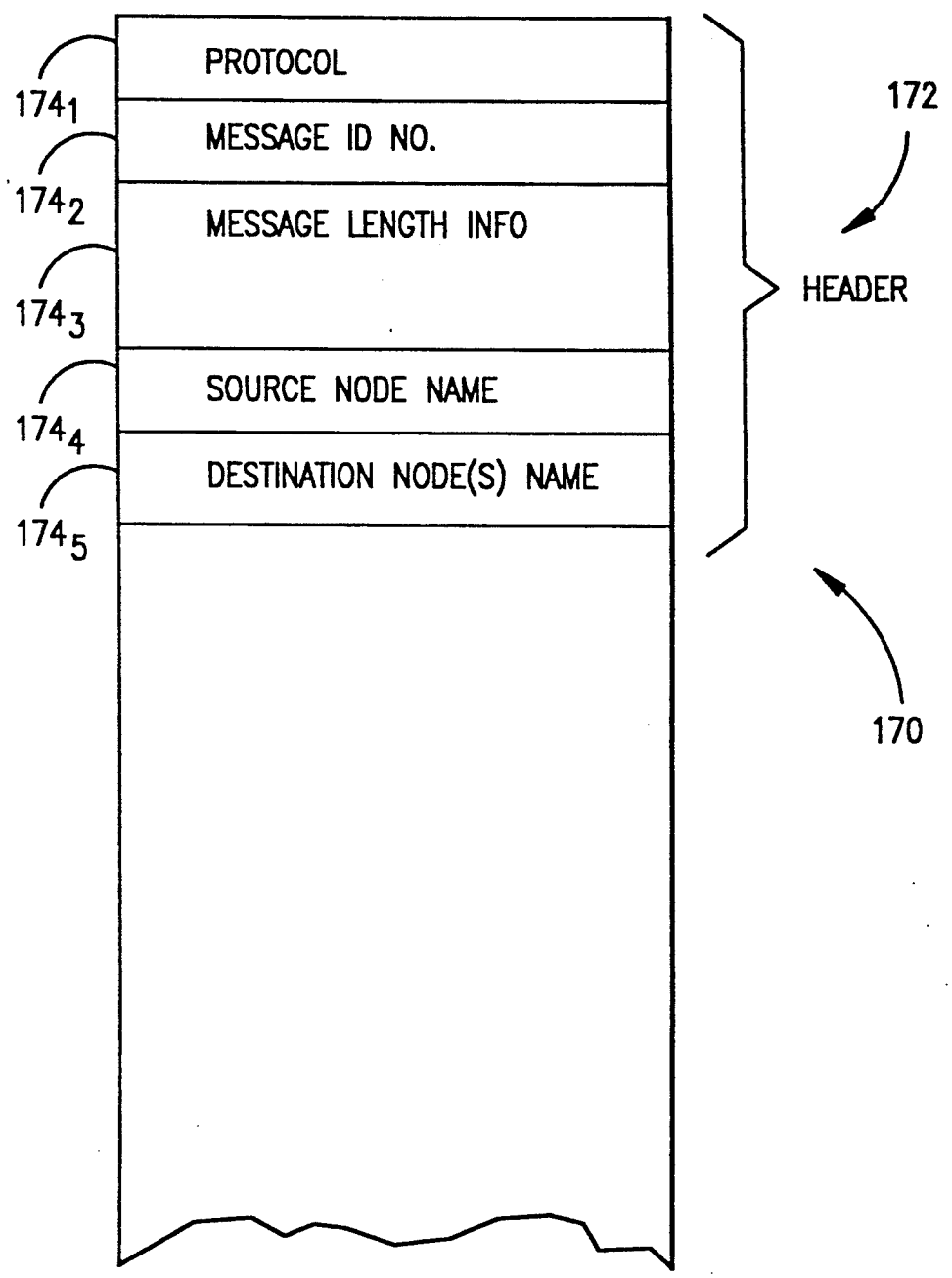
FIG. 13 is a schematic view of a format of a message transmitted on a network of the automatic telephone scheduling and dialing system of embodiments of the invention.

The format of a message 170 applied to a network interface for transmission on the network 30 is shown in FIG. 13. Each message 170 includes a header 172. The header 172 includes header portions $174_1$–$174_5$. The first portion $174_1$ of the header 172 is a protocol word which establishes the format of the header 172. The second portion $174_2$ of the header 172 is a word containing a value indicative of the message type or message ID (for example, a value indicating that the message is an AGENT LOGON message). The third portion $174_3$ of the header 172 contains one or more values pertaining to the length of the message. The fourth portion $174_4$ of the header 172 contains a value indicative of the source node name (i.e., the network logical mailbox name) of the node which originates or transmits the message to the network 30. The fifth portion $174_5$ of the header 172 contains a value indicative of the destination node name (i.e., the network logical mailbox name of the node) of the node(s) which are to receive the message on the network 30. The destination node name of header portion $174_5$ can be a group node name referring to a plurality of nodes. For example, for an AGENT LOGON message the value in header portion $174_5$ is a logical mailbox name which indicates that both data servers 22 and 62 are to receive the message.

The AGENT LOGON message is shown in FIG. 10 as being initiated at time 200. The AGENT LOGON message is transmitted to both data servers 22, 62. In response to the AGENT LOGON message, at 202 one of the data servers sends the agent workstation 28 an AUTHORIZED CAMPAIGNS message which includes list of active campaigns in which the agent is authorized to participate. The agent strikes a responsive key on the keyboard 130 corresponding to the desired campaign, thereby generating at 204 a CAMPAIGN ATTACH message which is sent to both data servers. The data server designated as the manager for the selected campaign then (at 206) sends a CAMPAIGN SPECIFIC INFO message to the agent workstation 28 in order to download to the workstation 28 campaign format files including information pertaining to such matters as workstation screen layouts, workstation keyboard definitions, call result codes, and the name of the data server which serves as the manager for the selected campaign. Thereafter, at time 208, the data server sends a START CAMPAIGN message to the agent workstation, thereby notifying the agent workstation 28 that calling can begin.

After execution of the agent logon mode as described above, the system 60 enters a predictive dialing mode depicted both in the message sequence scenario of FIG. 0 and the state diagram of FIG. 12. In the predictive dialing mode, after the receipt of the START CAMPAIGN message the agent workstation 28 enters an AGENT AVAILABLE STATE. Upon receipt of keyboard input by which an agent indicates that he is ready, the workstation 28 sends an AGENT AVAILABLE message (as at 210) to the dial server to which it is connected, for example dial server 24. The AGENT AVAILABLE message includes a field informing the dial server of the campaign number in which the agent is participating, as well as the name of the data server which is the manager for that campaign.

The dial server 24, being initially in a PACING IDLE STATE, can transition to a FETCH RECORD STATE after the dial server 24 both receives the AGENT AVAILABLE message from the workstation 28 and an internally-generated pacing logic interrupt. The pacing logic interrupt is generated by the processor 80 of the dial server 24 in order to initiate outgoing calls at a rate in order to utilize most effectively the agents situated at the agent workstations. Each campaign has its own pacing logic. The pacing logic interrupt is generated in accordance with such campaign-specific factors as the number of agents logged on at any one time to a given campaign, the connect rate of calls (the rate of successfully reached accounts), the average time of contact per call, etc.

When the dial server 24 enters the FETCH RECORD STATE, the dial server 24 generates a REQUEST RECORD message (as at time 212) for transmission to the data server known to be the manager for the campaign in which the agent is participating. In the present example, it will be assumed that the data server 22 is to be accessed for the particular campaign being handled.

Upon receipt of the REQUEST RECORD message from the dial server 24, the data server 22 transitions from an IDLE STATE to an OBTAIN RECORD STATE. In the OBTAIN RECORD STATE, the data server 22, through the file server 78 (see FIG. 8), accesses a portion of memory 78A wherein are stored account records 162 (FIG. 9) which have yet to be processed for the campaign.

Upon retrieval of the next record for processing for the designated campaign, at time 214 the data server 22 transmits the entire account record 162 as part of RECORD RESPONSE message to the dial server 24, and therewith returns to the IDLE STATE. Upon receipt of the RECORD RESPONSE MESSAGE, the dial server 24 moves to a LINE IDLE STATE, and ultimately to a DIAL TONE DETECT STATE. When the dial server 24, particularly one of the VCC/dialers 92 included therein, detects a dial tone, the dial server 24 transitions to a DIAL STATE. In the DIAL STATE, a VCC/dialer 92 dials the telephone number provided in field $164_6$ of the most recently-fetched record. Upon completion of dialing, the dial server 24 transitions to a LINE MONITOR STATE.

In the LINE MONITOR STATE the dial server 24 monitors the status of the dialed telephone line 92. If a line status interrupt from the VCC/dialer 92 indicates that the dialed telephone line is busy or is unanswered, the dial server 24 generates a NO-ANSWER UPDATE message (as at time 216) for transmission to the data server 22 before transitioning back to the FETCH RECORD STATE.

Upon receipt of a NO-ANSWER UPDATE message, the data server 22 enters a STORE RECORD UPDATE STATE, and particularly stores the record in a portion of the memory 78A so that the record will again be accessed at a subsequent time in connection with its associated campaign. After storage of the record, the data server 22 returns to its IDLE STATE.

If a line status interrupt from the VCC/dialer 92 indicates that the dialed telephone line is answered, the dial server 24 generates a CALLER CONNECT message (as at time 218) for transmission to the agent workstation 28 before transitioning to an AWAIT CALL ACCEPTANCE STATE. The CALLER CONNECT message includes the entire account record 162 most recently obtained from the data server 22 in the manner just described, including the appended locator field $164_8$. In most instances the agent can accept the call, and upon receipt of the CONNECT ACCEPT and enters an AWAIT CALL TERMINATION STATE.

Upon receipt of the CALLER CONNECT message, the agent workstation 28 enters a CALL ACCEPT STATE. If the agent can accept the call, a CONNECT ACCEPT message is generated (as at 220) for transmission to the dial server 24 before the agent workstation enters a CALL HANDLING STATE. Should the CONNECT ACCEPT message indicate that the agent workstation cannot accept the call, the dial server 24 issues a NONCONNECT UPDATE to the data server 22 and transitions back to the FETCH RECORD STATE. The data server 22 handles the NO CONNECT UPDATE message in essentially the same manner as it did the NO-ANSWER UPDATE message.

In the CALL HANDLING STATE, the processor 120 of the agent workstation 28 stores in the workstation register 136 the account record 162 that was transmitted to the agent workstation 28 in the CALLER CONNECT message. In addition, the workstation processor 120 causes the agent to view on the CRT 134 information corresponding to the information included in the account record 164. Moreover, in the CALL HANDLING STATE the dial server 24 connects the headset 138 of the workstation 28 (via one of the lines in cable 32) to the one of the telephone lines 92 which was dialed with the telephone number provided in field $164_6$ of the account record 162, so that the agent can carry on an audio conversation with the party named in the account record 162. The actual audio connection between the dialed one of the lines in telephone line 92 and the line in cable 32 connected to the agent's headset 138 is performed by one of the audio MUXes 88.

During the CALL HANDLING STATE the agent at workstation 28 can make changes or additions (via the keyboard 130) to the account record 162 stored in the register 136, such as correcting address information in field $164_4$ or account status information in field $164_5$, for example. Upon completion of the call, the agent strikes an appropriate key on the keyboard 130 for the agent workstation 28 to enter a CALL TERMINATION STATE. In the CALL TERMINATION STATE, the workstation 28 issues a CALL RELEASE message (as at 222) to the dial server 24 before transitioning to a RECORD RELEASE STATE.

Upon receipt of the CALL RELEASE message from the agent workstation 28, the dial server 24 transitions from the AWAIT CALL TERMINATION STATE to a CALL DISCONNECT STATE. After the dial server 24 discerns from one of its VCC/dialers 90 that the telephone line has been disconnected, the dial server 24 sets a disconnect flag that is requisite for the dial server 24 to transition from the LINE IDLE STATE to the DIAL TONE DETECT STATE.

In the RECORD RELEASE STATE, the agent workstation 28 issues a RECORD RELEASE message (as at 224) to the dial server 24, which causes the dial server to enter a RECORD UPDATE STATE. The RECORD RELEASE message includes the entire account record 162 modified by the agent's keyboard input at the agent workstation 28. Upon receipt of the RECORD RELEASE MESSAGE, the dial server 245 issues an ANSWER UPDATE message (as at 226) to data server 22. The ANSWER UPDATE message includes not only the entire account record 162 as possibly modified at the agent workstation 28, but also has appended thereto by the dial server 24 certain current dial server statistical information, including values of the factors taken into consideration by the dial server pacing scheme. The dial server 24 then re-enters its PACING IDLE STATE to await the pacing logic interrupt and a further AGENT AVAILABLE message.

Upon receipt of the ANSWER UPDATE message the data server 22 enters its STORE RECORD UPDATE STATE to store the account record 162 included in the ANSWER UPDATE message in a portion of its memory 78A reserved for records for which processing for this campaign has been completed.

After leaving the RECORD RELEASE STATE, the agent workstation 28 returns to AGENT AVAILABLE STATE. As indicated previously, upon entering the AGENT AVAILABLE STATE the agent workstation issues an AGENT AVAILABLE message to the dial server 24.

When the agent is ready to sign off of a campaign, the agent strikes an appropriate key on keyboard 130 (while in the AGENT IDLE STATE) to generate an AGENT LOGOFF message (as at 228) for transmission to the data server 22.

It should be understood in connection with the foregoing discussion that one AGENT AVAILABLE message to the dial server 24 may trigger the dialing of multiple calls. For example, upon receipt of the AGENT AVAILABLE message the pacing logic included in the dial server 24 may have determined that the dialing of a plurality of calls is needed in order to maintain the pace computed by the pacing logic. Moreover, it should be understood that, whereas the state diagram of FIG. 12 is shown in only two dimensions, a third dimension actually exists inter alia for interfacing with the plurality of agent workstations 28 to which a call could be connected.

Figure 11:
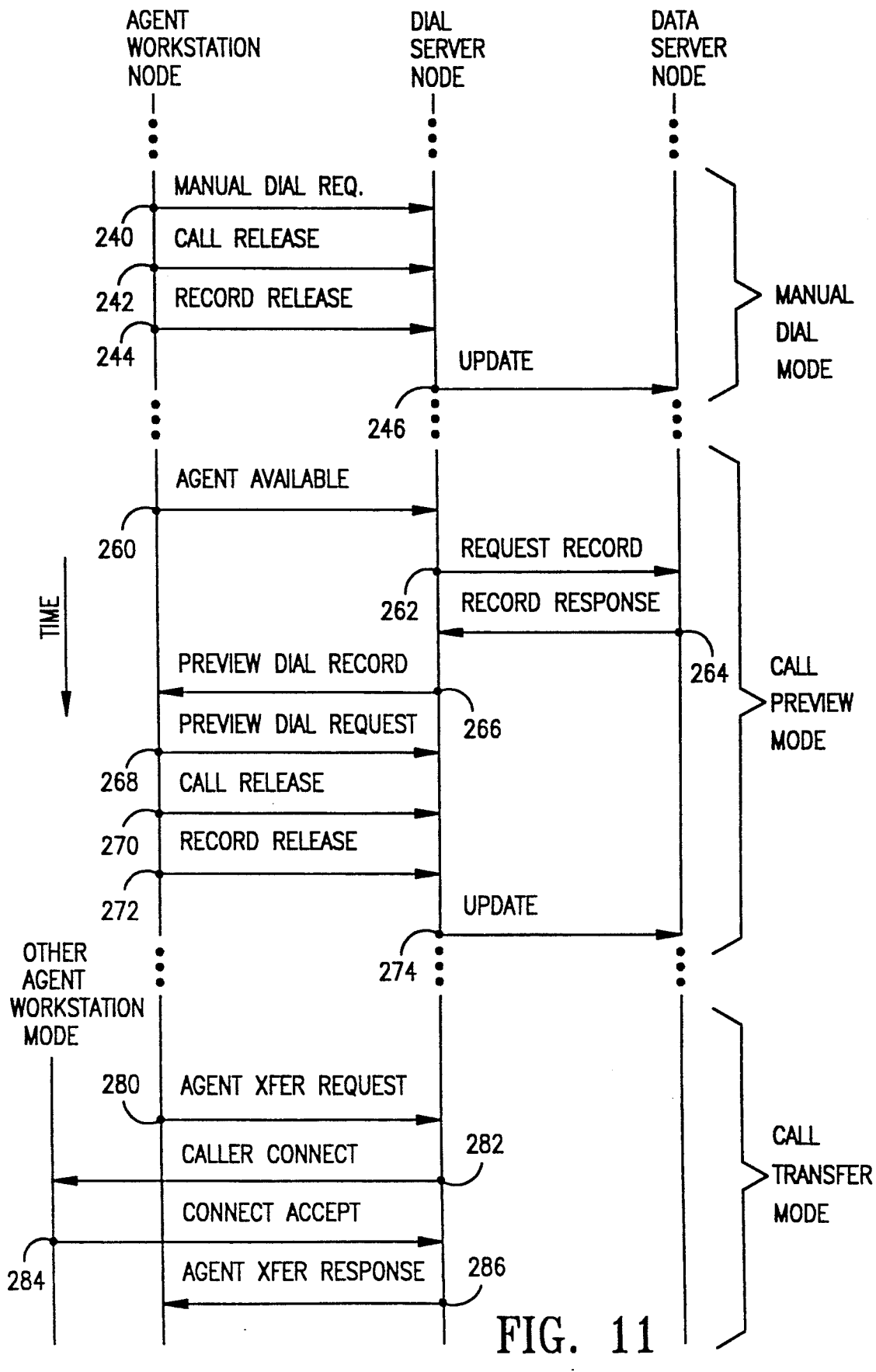

FIG. 11 shows other modes of operation of the system 60, including a manual dialing mode; a call preview mode; and, a call transfer mode.

In the manual dialing mode, the agent strikes a key on keyboard 130 of the workstation 28 in order initiate a MANUAL DIAL REQ message, and further strikes keys representative of the telephone number to-be-dialed for inclusion in the MANUAL DIAL REQ message. The MANUAL DIAL REQ message is sent (as indicated at time 240) to the dial server 24. Upon receipt of the MANUAL DIAL REQ message, the dial server 24, acting through its audio MUXes 88 and VCC/Dialers 90, dials the telephone number provided in the MANUAL DIAL REQ message and connects the telephone line 92 upon which the number was dialed (via the cable 32) to the headset 138 of the agent whose workstation 38 generated the MANUAL DIAL REQ message. A blank account record is displayed by the processor 120 on the CRT 134 of the agent workstation 28. Using the keyboard 130, the agent enters appropriate data into applicable fields of the record 162. Upon completion of the call and the data entry, the agent strikes keys to issue a CALL RELEASE message (at 242) and a RECORD RELEASE message (at 244) to the dial server 24. The CALL RELEASE message and RECORD RELEASE message are analogous to the messages of the same name in the predictive dialing mode. Upon receipt of the RECORD RELEASE message, at $246$ the dial server 24 issues an UPDATE message which is similar to the ANSWER UPDATE of the predictive dialing mode (FIG. 10).

In the call preview mode, an agent at workstation 28 issues an AGENT AVAILABLE message (at time 260) to the dial server 24 in similar manner as described for other modes. Thereafter, the dial server 24 generates a REQUEST RECORD message (at 262), to which the data server 22 answers with a RECORD RESPONSE message. As in other modes, the RECORD RESPONSE message includes an entire account record. Upon receipt of the RECORD RESPONSE message, the dial server 24 generates (as at 266) a PREVIEW DIAL RECORD message (which includes the entire account record acquired from the data server 22) for transmission to the agent workstation 28 which generated the AGENT AVAILABLE message. The entire account record 162 is then displayed on the CRT 134 of the agent workstation 28.

In one submode of the call preview mode, if the agent at the workstation 28 decides that he wants to call the party named in the account record received in the PREVIEW DIAL RECORD message, the agent strikes a key on keyboard 130 to send a PREVIEW DIAL REQUEST message to the dial server 24 (as at 268). Upon receipt of the PREVIEW DIAL REQUEST message, the dial server 24 dials the telephone number provided in field $164_6$ of the previewed record and automatically connects the line upon which the call was dialed to the headset 138 of the previewing workstation 28 in like manner as described in other modes. In another submode of the call preview mode, the PREVIEW DIAL REQUEST message is issued automatically, with or without a programmed delay.

As in other modes, in the call preview mode the agent can modify or add to the contents of the account record 162. Upon completion of the call, the agent initiates CALL RELEASE (at 270) and RECORD RELEASE (at 272) messages to the dial server 24, which are handled in similar manner as in other modes. Similarly, the dial server 24 issues an UPDATE message (at 274) to the data server 22, which is handled in similar manner as the ANSWER UPDATE message of the predictive dialing mode.

In the call transfer mode, which can occur in the context of other modes such as the predictive dialing mode, an agent at a workstation, such as workstation $28_1$, can request that a call be transferred to another workstation by striking an appropriate key on the keyboard 130 in order to generate an AGENT XFER REQUEST message for application to the dial server 24 (time 280). The AGENT XFER REQUEST includes the entire account record to be transferred. The dial server 24 then issues a CALLER CONNECT message (at 282) to another of the agent workstations, such as workstation $28_2$. The CALLER CONNECT message includes the entire account record to be transferred. If the agent at workstation $28_2$ is available, the workstation $28_2$ automatically issues a CONNECT ACCEPT message (at 284) to the dial server 24. The dial server 24 then issues (at 286) an AGENT XFER RESPONSE message to advise agent workstation $28_1$ whether another workstation accepted the transfer.

As indicated previously, in the foregoing description the operation of dial server 64 is essentially identical to that of dial server 24, with the exception that dial server 64 communicates with agent workstations 68 while the dial server 24 communicates with agent workstations 28. Both dial servers 24, 64 can ultimately access either data server 22 or data server 62. In this regard, a dial server initially transmits a REQUEST RECORD message to the data server designated as the manager for the campaign in which the available agent is participating. The managing data server, through the logic of its processor (such as processor 75 of data server 22), determines whether to obtain an account record 162 for the campaign from its own memory, or from the memory of another data server.

The supervisor workstation 26 performs a plurality of functions, including creating campaigns, editing account records, joining other nodes in the network 30, and generating reports (both historical and real time). In creating campaigns, an agent at the supervisor workstation 26 determines in which campaigns the various agents are authorized to participate. In addition, the supervisor workstation 26 prepares or customizes the screens for each campaign which are to appear at the agent workstations 28. The supervisor workstation 28 designates a data server as being the manager for a particular campaign by transmitting this information to the designated data server over the network 30. Furthermore, the supervisor workstation can edit account records 162 by file import and export from the data servers. The supervisor workstation 26 can also monitor the activities of the agent workstations, or of a dial server or data server, using a remote join facility of the network 30 (provided by conventional software such as "The Network Eye" marketed by Artisoft Corporation).

While the invention has been particularly shown and described with reference to the preferred embodiments thereof, it will be understood by those skilled in the art that various alterations in form and detail may be made therein without departing from the spirit and scope of the invention. For example, it should be understood that the expected development of more sophisticated network and telephone switching technology will enable the present invention to employ more than two dial servers and more than two data servers.

The embodiments of the invention in which an exclusive property or privilege is claimed are defined as follows:

1. An automatic telephone dialing system comprising:
   storage means for storing a plurality of account information records, each account information record being formatted to include therein a telephone number field;
   data served processor means for handling input and output operations for the account information records stored in the storage medium;
   at least one dial server processor means;
   means, under the control of the dial server processor means, for placing a telephone call on a telephone trunk line to a person associated with an account corresponding to a telephone number stored in the number field of an account information record;
   a plurality of agent workstations, each agent workstation comprising:
   a workstation processor means;
   means for visually displaying at least a portion of an account information record, the visual display means being connected to the workstation processor means;
   means for providing information to the workstation processor means, including workstation status information and account update information, said means for providing information being connected to the workstation processor means;
   audio transmission means for producing and receiving telephonic audio transmissions;
   a communications network for transmitting messages including at least a portion of account information records between an agent workstation and the dial server processor means; for transmitting messages providing agent available status information to the dial server processor means; for providing log-on status information from the workstation processor means to the data server processor means, said logon status information including a campaign attach message selecting one of a plurality of campaigns; for transmitting, under the control of the dial server processor means, said account information records between the data server processor means and the dial server processor means; and,
   means, under the control of the dial server processor means, for connecting an answered telephone call on the telephone trunk line to the audio transmission means of an available one of the agent workstations.

2. The apparatus of claim 1, further comprising:
   a plurality of dial server processor means, each of the dial server processor means being connected by the communications network to a unique set of agent workstations.

3. The apparatus of claim 1, further comprising:
   a plurality of data server processor means accessing an associated plurality of memories, with the dial server processor means being connection to each of said data server processor means by the communications network, whereby the dial server processor means requests an account information record from a select one of the data server processor means in accordance with information provided by an available one of the agent workstations.

4. The apparatus of claim 3, wherein one of the data servers processor means is designated as a manager for a campaign.

5. The apparatus of claim 4, wherein account information records belonging to a campaign are stored in a plurality of memories with each memory being associated with a different data server processor means.

6. An automatic telephone dialing system comprising: a plurality of agent workstations, each agent workstation comprising:
- a workstation processor including workstation register means for storing therein at least a portion of an account information record, each account information record being formatted to include therein a telephone number field;
- means for visually displaying at least a portion of the account information record, the visual display means being connected to the workstation processor;
- means for manually entering information into the workstation processor including workstation status information and account information into the workstation register means, the information entry means being connected to the workstation processor;
- audio transmission means for producing and receiving telephonic audio transmissions;

a data server comprising:
- a data server processor;
- a storage medium upon which are stored a plurality of the account information records, the storage medium being connected to the data server processor whereby the data server processor can input and output the account information records from the storage medium;

a dial server comprising:
- a dial server processor;
- means under the control of the dial server processor for placing a telephone call on a telephone trunk line;
- means under the control of the dial server processor for connecting an answered telephone call on the telephone trunk line to the audio transmission means of an available one of the agent workstations;

a data transmission network connected to include as nodes thereof each of the workstation processors, the data server processor, and the dial server processor, for transmitting messages between the nodes, wherein said messages include a message from an agent workstation identifying a selected campaign from a plurality of campaigns.

7. The apparatus of claim 6, further comprising:
a plurality of dial servers, each of the dial servers being connected by the data transmission network to the same data server and to a unique set of agent workstations.

8. The apparatus of claim 6, further comprising:
a plurality of data servers accessing an associated plurality of memories, with the dial server being connected to each of said data servers by the data transmission network whereby the dial server requests an account information record from a select one of the data servers in accordance with information provided by an available one of the agent workstations.

9. The apparatus of claim 8, wherein one of the data servers is designated as a manager for a campaign.

10. The apparatus of claim 9, wherein account information records belonging to a campaign are stored in a plurality of memories with each memory being associated with a different data server.

11. A method of operating an automatic telephone dialing system in a telephone calling champaign, the method comprising:
- (a) providing a data server means with access to a plurality of account information records, the account information records being formatted to include a telephone number in a telephone number field, said data sever means accessing a particular set of records corresponding to a particular campaign selected from a plurality of available campaigns;
- (b) communicating to a dial server means the identity of an available agent workstation which has previously logged on with one or more of said plurality of available campaigns selected for participating in said particular campaign;
- (c) transmitting an account information record for the campaign to the dial server means from the data server means in response to a request from the dial server means;
- (d) accessing a telephone line and dialing thereupon a telephone number included in an account information record transmitted to the dial server means;
- (e) connecting the telephone line obtained at step (d) with the available agent workstation;
- (f) transmitting the account information record of step (c) to the available agent workstation;
- (g) permitting any necessary modifications to the account information record transmitted to the available agent workstation; the,
- (h) returning the account information record of step (g) from the available agent workstation to the dial server means; the,
- (i) returning the account information record of step (g) from the dial server means to the data server means.

12. The method of claim 11, including communicating to the data server means the identity of an agent workstation participating in the campaign prior to executing step (c) with respect to that agent workstation.

13. A method of operating an automatic telephone dialing system in a telephone calling campaign, the method comprising:
- (a) providing a plurality of data server means, each data server means being connected to an associated memory having stored therein a plurality of account information records, the account information records being formatted to include a telephone number in a telephone number field;
- (b) designating one of the data server means as a manager for managing a telephone calling campaign;
- (c) transmitting to an agent workstation an indication of a name of the data server means designated as the manager for the campaign in which the agent workstation will participate;
- (d) communicating to a dial server means the identity of an available agent workstation participating in the campaign along with the name of the data server means designated as the manager for the campaign; the manager data server means a request for an account information record for the campaign;

(f) determining, under the control of manager data server means, from the memory associated with which data server means an account information record should next be retrieved for the campaign;

(g) transmitting the next retrieved account information record for the campaign to the dial server means;

(h) accessing, under control of the dial server means, a telephone line and dialing thereupon a telephone number included in an account information record transmitted to the dial server means;

(i) connecting, under control of the dial server means, the telephone line obtained at step (h) with the available agent workstation;

(j) transmitting the account information record of step (g) to the available agent workstation.

14. The method of claim 13, further comprising:

permitting any necessary modifications to the account information record transmitted to the available agent workstation; then, returning the account information record from the available agent workstation to the dial server means; the, returning the account information recorded from the dial server means to the managing data server means.

15. A method of operating an automatic telephone dialing system in a telephone calling campaign, the method comprising:

(a) providing a data server means with access to a plurality of account information records, the account information records being formatted to include a telephone number in a telephone number field;

(b) providing a plurality of distinct sets of agent workstations capable of being connected to telephone calls and of receiving account information records;

(c) connecting each set of agent workstations to a respective one of a plurality of dial server means;

(d) communicating to each of the respective dial server means that one of the agent workstations connected thereto is available;

(e) communicating from the respective dial server means to the data server means a request for an account information record;

(f) transmitting the next retrieved account information record for a particular campaign to the requesting dial server means, said particular campaign having been chosen by the available agent workstation previously from a plurality of available campaigns;

(g) accessing, under control of the dial server means, a telephone line and dialing thereupon a telephone number included in an account information record transmitted to the dial server means;

(h) connecting, under control of the dial server means, the telephone line obtained at step (g) with the available agent workstation;

(i) transmitting the account information record of step (f) to the available agent workstation.

16. The method of claim 15, further comprising:

permitting any necessary modifications to the account information record transmitted to the available agent workstation; then, returning the account information record from the available agent workstation to the respective dial server means; then, returning the account information record from the dial server means to the data server means.

* * * * *